(12) United States Patent
Greenfeld et al.

(10) Patent No.: US 6,538,905 B2
(45) Date of Patent: Mar. 25, 2003

(54) DC-TO-DC POWER CONVERTER INCLUDING AT LEAST TWO CASCADED POWER CONVERSION STAGES

(75) Inventors: Fred F. Greenfeld, Broomfield, CO (US); Karl Rinne, Waterford (IE)

(73) Assignee: Artesyn Technologies, Inc., Boca Raton, FL (US)

( * ) Notice: Subject to any disclaimer, the term of this patent is extended or adjusted under 35 U.S.C. 154(b) by 0 days.

(21) Appl. No.: 09/757,991

(22) Filed: Jan. 10, 2001

(65) Prior Publication Data

US 2001/0030879 A1 Oct. 18, 2001

Related U.S. Application Data

(60) Provisional application No. 60/194,511, filed on Apr. 4, 2000.

(51) Int. Cl.⁷ .............................................. H02M 3/335
(52) U.S. Cl. ......................................................... 363/17
(58) Field of Search ............................... 363/16, 17, 52, 363/53, 125, 127

(56) References Cited

U.S. PATENT DOCUMENTS 5,245,520 A    9/1993  Imbertson
5,932,995 A  * 8/1999  Wagoner ..................... 323/222
6,191,964 B1 * 2/2001  Boylan et al. ................ 363/89
6,246,592 B1 * 6/2001  Balogh et al. ................ 363/16
6,275,401 B1 * 8/2001  Xia ............................ 363/127

OTHER PUBLICATIONS

Balogh et al., "Unique Cascaded Power Converter Topology For High Current Low Output Voltage Applications," *Unitrode Power Supply Design Seminar*, 1999, p. 1–1 to 1–23.

* cited by examiner

*Primary Examiner*—Adolf Deneke Berhane
(74) *Attorney, Agent, or Firm*—Kirkpatrick & Lockhart LLP

(57) ABSTRACT

A DC-DC power converter. According to one embodiment, the power converter includes a symmetrical half-bridge converter including a transformer having a primary winding and first and second secondary windings, a primary circuit coupled to the primary winding, a first rectifier circuit coupled to the first secondary winding, and a second rectifier circuit coupled to the second secondary winding, and first and second buck converters coupled to the half-bridge converter.

53 Claims, 15 Drawing Sheets

DC-TO-DC POWER CONVERTER INCLUDING AT LEAST TWO CASCADED POWER CONVERSION STAGES

CROSS-REFERENCE TO RELATED APPLICATIONS

This application claims priority under 35 U.S.C. §119(e) to provisional U.S. patent application Ser. No. 60/194,511, filed Apr. 4, 2000.

STATEMENT REGARDING FEDERALLY SPONSORED RESEARCH OR DEVELOPMENT

Not Applicable.

BACKGROUND OF INVENTION

1. Field of Invention

The present invention relates generally to power conversion and, more particularly, to DC-DC power converters.

2. Description of the Background

DC-to-DC power converters are widely utilized in power supplies to convert an input DC voltage into a specified output DC voltage. For modem low power digital applications, typically DC-to-DC power converters are required to efficiently convert an unregulated input DC voltage of, for example, 48V or 120V, to a substantially constant output voltage as low as 5V, 3.3V, or even 1.5V.

Prior art isolated power converters typically regulate the output voltage of the converter by modulating the pulse width of the primary side input switches. A significant source of inefficiency for power converters, however, results from the turning on of the input switches, which are typically MOSFETs, at other than zero volts. Some of these converter topologies can realize zero-voltage switching of the input switches with duty cycle control, but such topologies are ordinarily limited to single-ended converters or to specialized topologies such as the phase-shifted fill bridge.

For double-ended converters employing a symmetric half-bridge topology, zero-voltage switching cannot be realized when the primary switches are pulse-width modulated. In addition, although highly efficient zero-voltage switching of the input switches for half-bridge converter topologies may be realized by fixing the duty cycle of the primary switches at or near fifty percent, the output voltage of the converter will change proportionally with a fluctuating input voltage, which is unacceptable for most modern applications.

Accordingly, there exists a need to achieve a high efficiency isolating converter with zero-voltage switching that maintains high efficiency regulation of the output voltage.

BRIEF SUMMARY OF INVENTION

The present invention is directed to a power converter. According to one embodiment, the power converter includes a symmetrical half-bridge converter. The symmetrical half-bridge converter includes a transformer having a primary winding and first and second secondary windings, a primary circuit coupled to the primary winding, a first rectifier circuit coupled to the first secondary winding, and a second rectifier circuit coupled to the second secondary winding. In addition, the power converter includes first and second buck converters coupled to the half-bridge converter.

According to another embodiment, the power converter includes a first power conversion stage including a transformer, at least two unregulated primary switches coupled to the transformer, a first rectifier circuit coupled to the transformer, and a second rectifier circuit coupled to the transformer. In addition, the power converter includes a second power conversion stage coupled to the first and second rectifier circuits of the first power conversion stage, the second power conversion stage including first and second buck converters.

According to another embodiment, the power converter includes a symmetrical half-bridge converter including a transformer having a primary winding and first and second secondary windings, a primary circuit coupled to the primary winding, a first rectifier circuit coupled to the first secondary winding, and a second rectifier circuit coupled to the second secondary winding. In addition, the power converter includes a first buck converter coupled to the first and second rectifier circuits of the half-bridge converter.

According to another embodiment, the power converter includes a symmetrical half-bridge converter. The symmetrical half-bridge converter includes a transformer having a primary winding and a secondary winding, and a primary circuit coupled to the primary winding. In addition, the power converter includes first and second buck converters coupled to the secondary winding of the transformer.

In contrast to the prior art, embodiments of the present invention provide high-efficiency isolating power converters with zero voltage switching, which at the same time provide high efficiency regulation of the output voltage. These and other benefits of the present invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a DC-DC power converter. For example, details regarding the control circuits for controlling the switching of certain control-driven switches of the power converter are not provided herein. Those of ordinary skill in the art will recognize, however, that these and other elements may be desirable in a typical DC-DC power converter. However, because such elements are well known in the art, and because they do not facilitate a better understanding of the present invention, a discussion of such elements is not provided herein.

Figure 1:
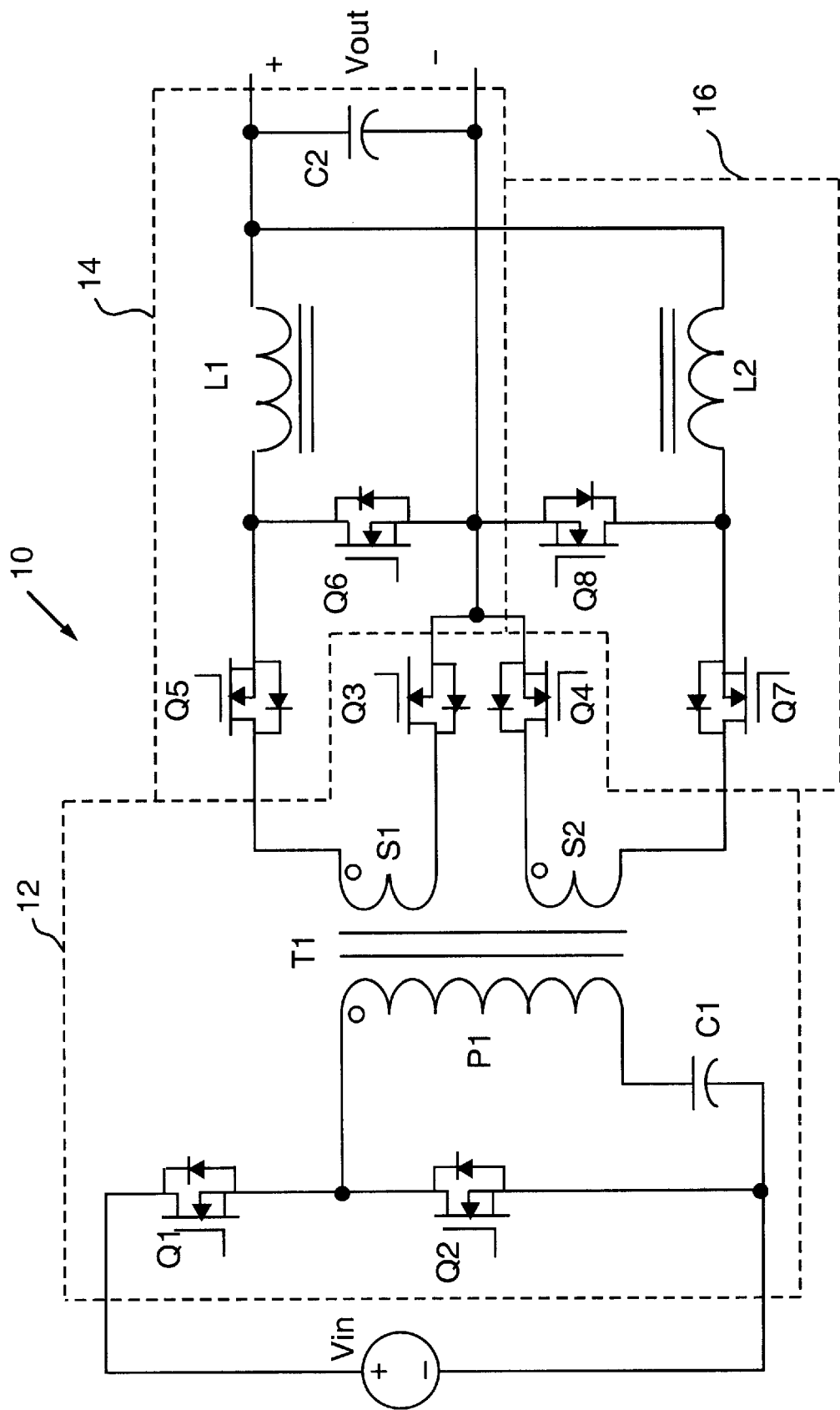
FIG. 1 is a schematic diagram of a power converter according to one embodiment of the present invention.

FIG. 1 is a schematic diagram of a power converter 10 according to one embodiment. The power converter 10 illustrated in FIG. 1 converts an unregulated input voltage ($V_{in}$) to an output voltage ($V_{out}$). The power converter 10 includes a half-bridge converter 12 feeding two buck converters 14, 16. The half-bridge converter 12 includes a primary circuit including primary switches Q1, Q2 and a capacitor C1. The half-bridge converter 12 also includes a transformer T1 having a primary winding P1 as well as having first and second secondary winding S1, S2. The half-bridge converter 12 also includes a pair of output rectifier circuits, each including, according to one embodiment, a synchronous rectifier Q3, Q4 respectively, as illustrated in FIG. 1.

The first buck converter 14 includes a pair of switches Q5 and Q6, an inductor L1, and a capacitor C2. The second buck converter 16 includes a pair switches Q7 and Q8, an inductor L2, and the capacitor C2. (It should be noted, however, that the dashed box 16 in FIG. 1 does not include the capacitor C2.)

Each of the switches Q1, Q2 may be controlled by a control circuit (not shown), as is known in the art, and their duty cycles may be independent of the output voltage $V_{out}$. According to one embodiment, each of the switches Q1, Q2 may operate symmetrically at just under a 50% duty cycle, such that there is no cross-conduction therebetween. The period of simultaneously non-conducting states for the switches Q1, Q2 may be sufficiently long to permit zero voltage switching (ZVS). The buck converters 14, 16 may operate synchronously with alternating half cycles of the half-bridge (i.e., the conduction/non-conduction cycles of the primary switches Q1, Q2).

For the embodiment illustrated in FIG. 1, the switches Q1–Q8 are schematically depicted as MOSFETs, however, according to other embodiments, some or all of the switches Q1–Q8 may be replaced with bipolar devices, such as BJTs or IGBTs.

Figure 2:
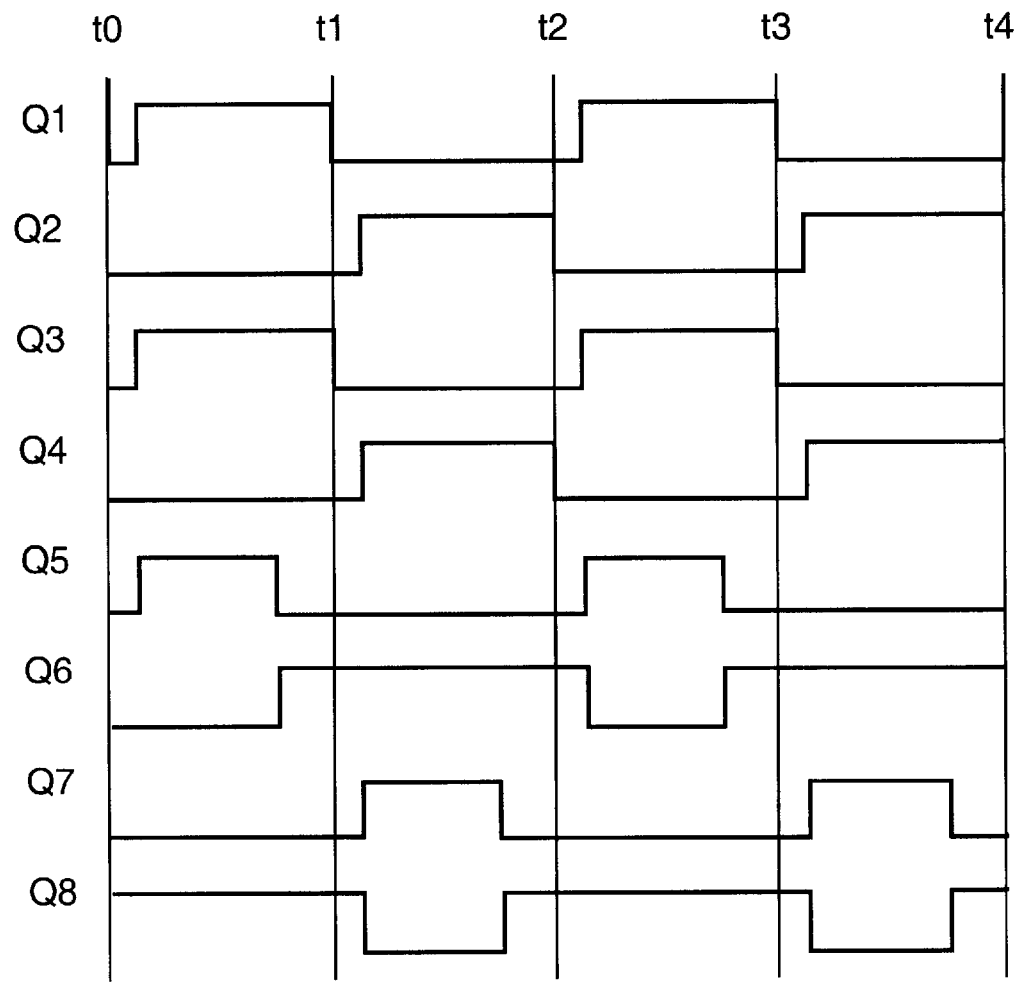
FIG. 2 is a timing diagram illustrating the operation of the power converter of FIG. 1 according to one embodiment of the present invention.

The operation of the converter 10 will now be described in conjunction with the timing diagram of FIG. 2, which illustrates the gate-source voltage of the switches Q1–Q8 according to one embodiment of the present invention. As such, the switches Q1–Q8 are on (conducting) when their corresponding gate-source voltage is high, and off (non-conducting) when their corresponding gate-source voltage is low. In FIG. 2, the first half cycle of the conduction/nonconduction switching intervals of the switches Q1, Q2 extends from the time t0 to the time t1, and the second half cycle extends from the time t1 to the time t2. The switches Q1 and Q3 are ON (or in a conductive state) for substantially the entire first half cycle (t0–t1), and the switches Q2 and Q4 are OFF (or in a non-conductive state). Thus, during the first half cycle (t0–t1), charge builds on the capacitor C1, and the voltage across the primary winding P1 of the transformer T1 is substantially $V_{in}/2$. The voltage across the primary winding P1 is magnetically coupled to the secondary windings S1, S2 of the transformer T1. At the beginning of the half cycle (t0), when the switches Q1 and Q3 turn ON, the switch Q5 may also turn ON and the switch Q6 turns OFF. The voltage across the first secondary winding S1 is therefore applied to the inductor L1 for substantially the entire first half cycle.

The ON time for the switch Q5 may be regulated independently of the switches Q1 and Q3 to achieve the desired output voltage $V_{out}$, and may terminate prior to or simultaneously with the end of the first half cycle (t1). When the switch Q5 turns OFF, the switch Q6 turns ON. The switch Q6 remains ON for the remainder of the first half cycle and throughout the second half cycle (t1–t2) as well.

At the end of the first half cycle (t1), the switches Q1 and Q3 turn OFF, and after a delay to allow the magnetizing and leakage inductance of the transformer T1 to force the voltage at the node between the switches Q1 and Q2 down to realize ZVS, the switches Q2 and Q4 turn ON, and remain ON for substantially the entire second half clock cycle (t1–t2). During this second half cycle, the voltage across the primary winding P1 is substantially $V_{in}/2$ because of the charge on the capacitor C1. At the beginning of the second half cycle (t1), when the switches Q2 and Q4 turn ON, the switch Q7 also turns ON and the switch Q8 turns OFF. The voltage across the second secondary winding S2 is applied to the inductor L2. The ON time for the switch Q7 may be regulated independently of the switches Q2 and Q4 to achieve the desired output voltage $V_{out}$, and may terminate prior to or simultaneously with the end of the second half cycle (t2). The duty cycle of Q7 may be the same as for the switch Q5. When the switch Q7 turns OFF, the switch Q8 turns ON, and remains ON for the remainder of the second half cycle and throughout the next half cycle (t2–t3) as well.

At the end of the second half cycle (t2), the switches Q2 and Q4 turn OFF, and after a short delay to allow the magnetizing and leakage inductance of the transformer T1 to force the voltage at the node between the switches Q1 and Q2 up to realize ZVS, the switches Q1 and Q3 turn ON.

Figure 3:
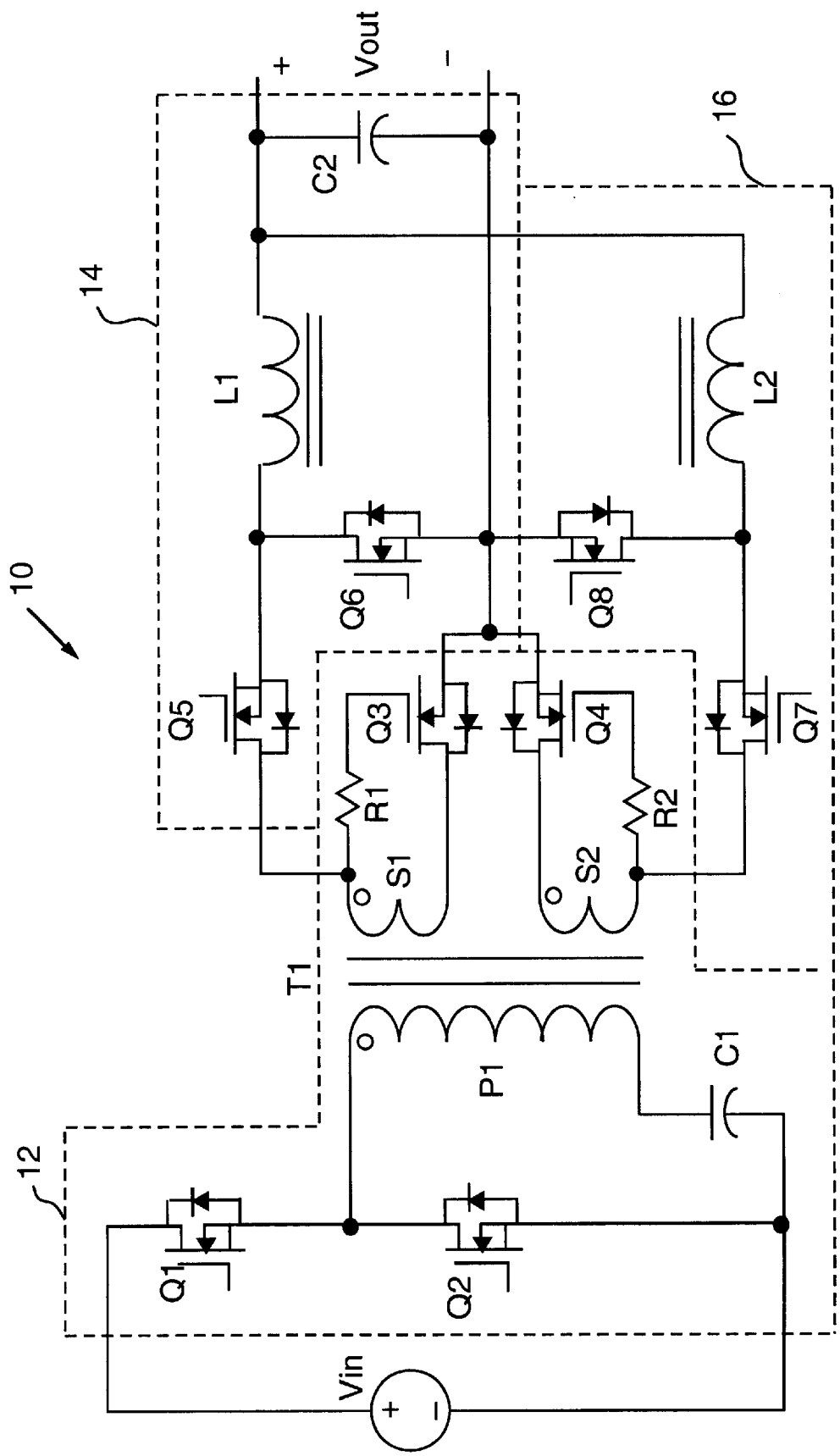
FIGS. 3–11 are schematic diagrams of the power converter according to other embodiments of the present invention.

The switches Q5–Q8 may be controlled by a control circuit (not shown), as is known in the art. In addition, the duty cycles of switches Q5–Q8 may be modulated by the control circuit, as known in the art, based on the output voltage ($V_{out}$). The synchronous rectifiers Q3, Q4 may be self-driven, such as illustrated in FIG. 3, wherein resistors R1, R2 respectively couple the voltage across the respective secondary windings S1, S2 of the transformer T1 to the control terminals of the switches Q3, Q4. According to another embodiment in which the synchronous rectifiers Q3, Q4 are self-driven, the synchronous rectifiers Q3, Q4 may be driven by the voltage across auxiliary secondary windings of the transformer T1 (not shown). According to another embodiment, the synchronous rectifiers Q3, Q4 may be control-driven, such as by a control circuit (not shown), as is known in the art.

According to one embodiment, the power converter 10 may utilize trailing-edge modulation of the switches Q5–Q8 to achieve output regulation. According to another embodiment of the present invention, the power converter 10 may achieve output regulation by using leading-edge modulation.

The power converter 10 combines the efficiency benefits of synchronous buck converters with a synchronous rectified half-bridge configuration having ZVS on the primary switches Q1, Q2. The converter 10 has the further advantage that the switches Q5 and Q7 can switch ON at zero current due to winding leakage inductance. Moreover, according to one embodiment, an open frame packaging design may be used because voltages greater than $V_{in}$ are not generated. Further, the half-bridge configuration yields an output ripple which is twice the primary switching frequency.

Figure 4:
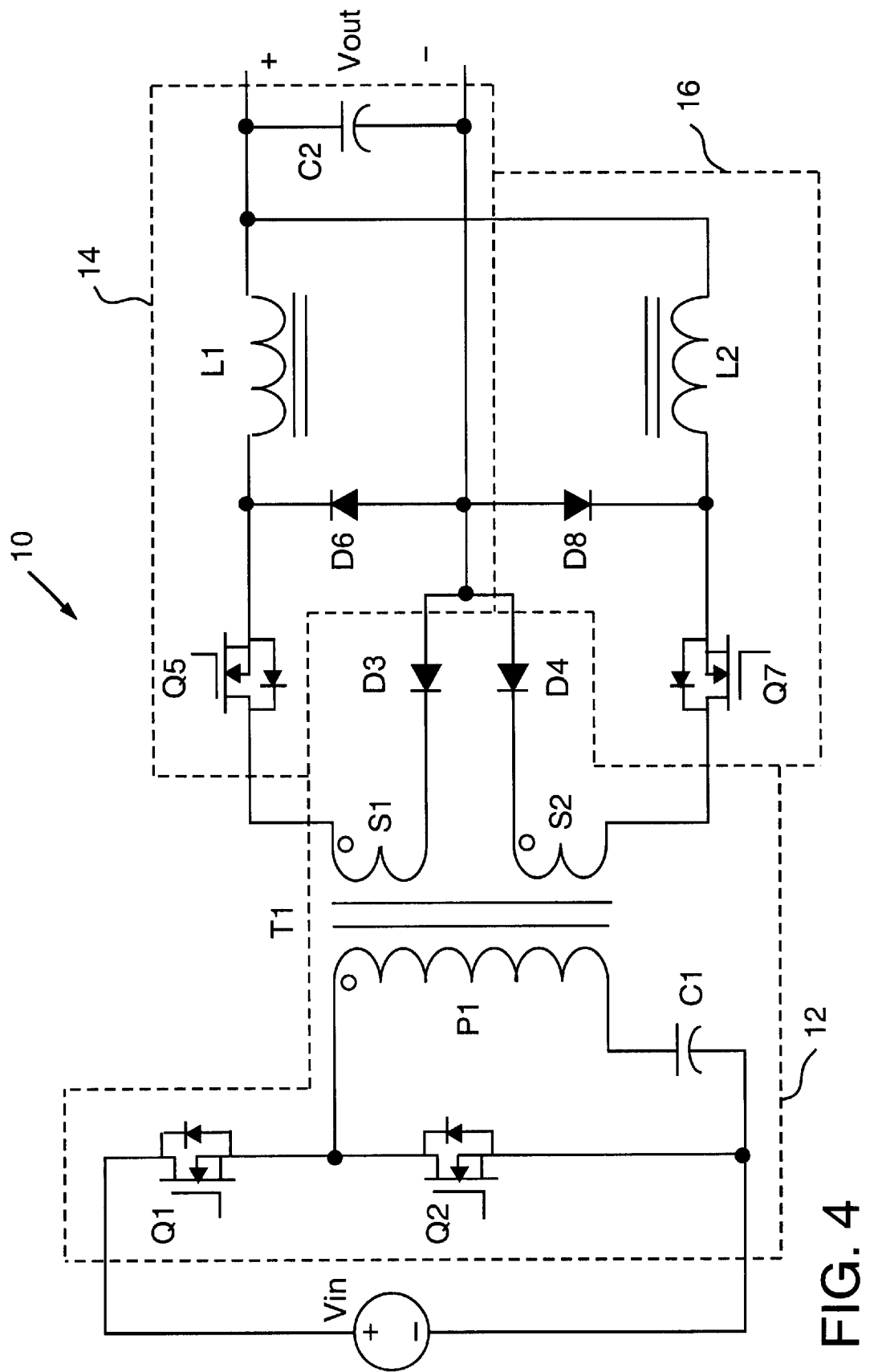

FIG. 4 is a schematic diagram of the converter 10 according to another embodiment. The converter 10 of FIG. 4 is similar to that of FIG. 1, except that the synchronous rectifiers Q3, Q4 of the output rectifier circuits of the half-bridge converter 12 have been replaced with rectifying diodes D3 and D4 respectively, and the switches Q6, Q8 of the buck converter 14, 16 have been replaced with diodes D6, D8 respectively.

Figure 5:
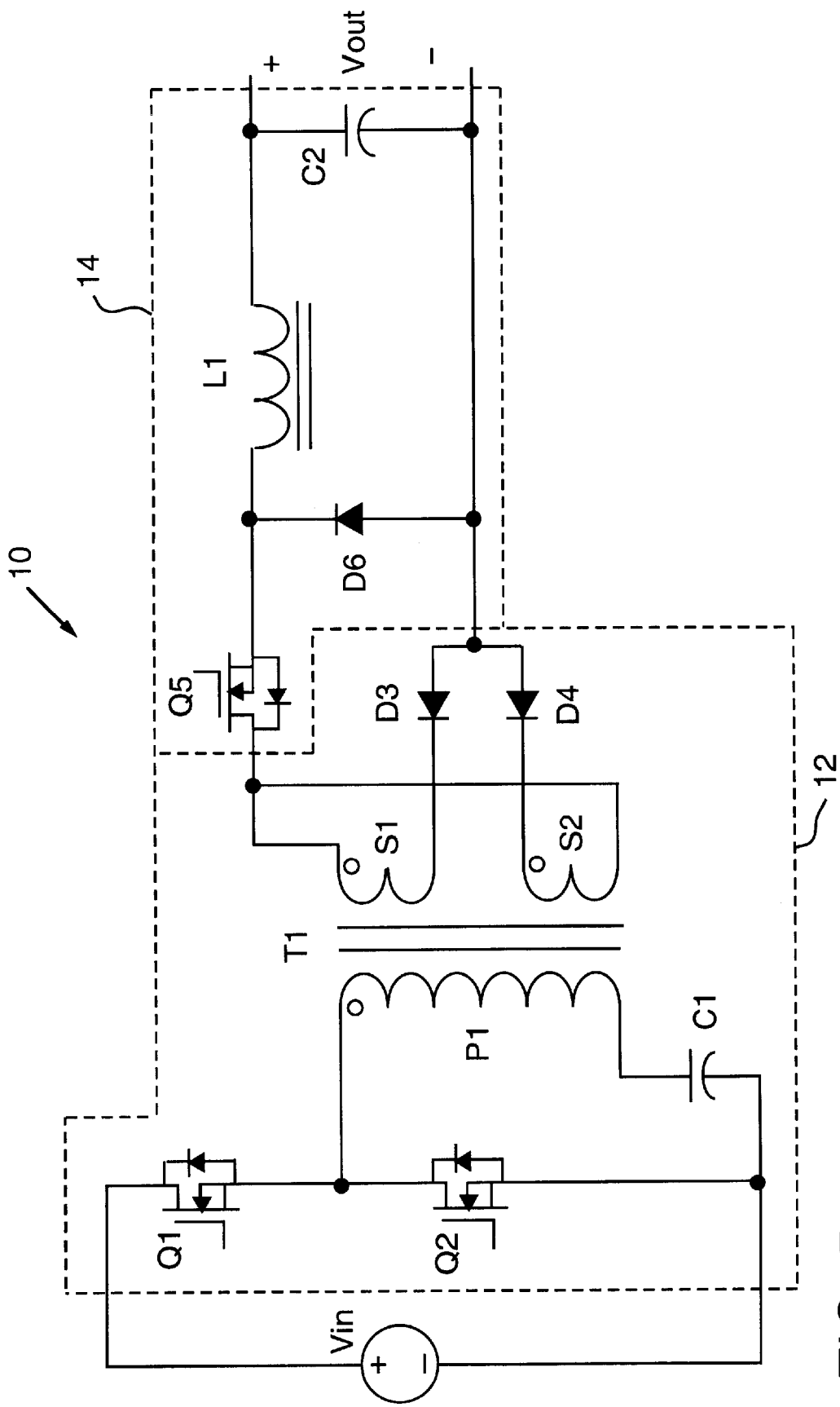

FIG. 5 is a schematic diagram of the converter 10 according to another embodiment. The converter 10 of FIG. 5 is similar to that of FIG. 4, except that the converter 10 includes only one buck converter 14, comprising the switch Q5, a diode D6, the inductor L1, and the capacitor C2. It should be noted that for this embodiment, both the secondary windings S1, S2 are coupled to the switch Q5 of the buck converter 14. According to another embodiment of the single buck converter topology, the output rectifier circuits of the half-bridge converter 12 and buck converter 14 may include synchronous rectifiers, as described hereinbefore with respect to FIGS. 1 and 3. According to another embodiment, additional buck converters may be added to the circuit in a manner similar to the single buck converter illustrated to provide multiple outputs.

Figure 6:
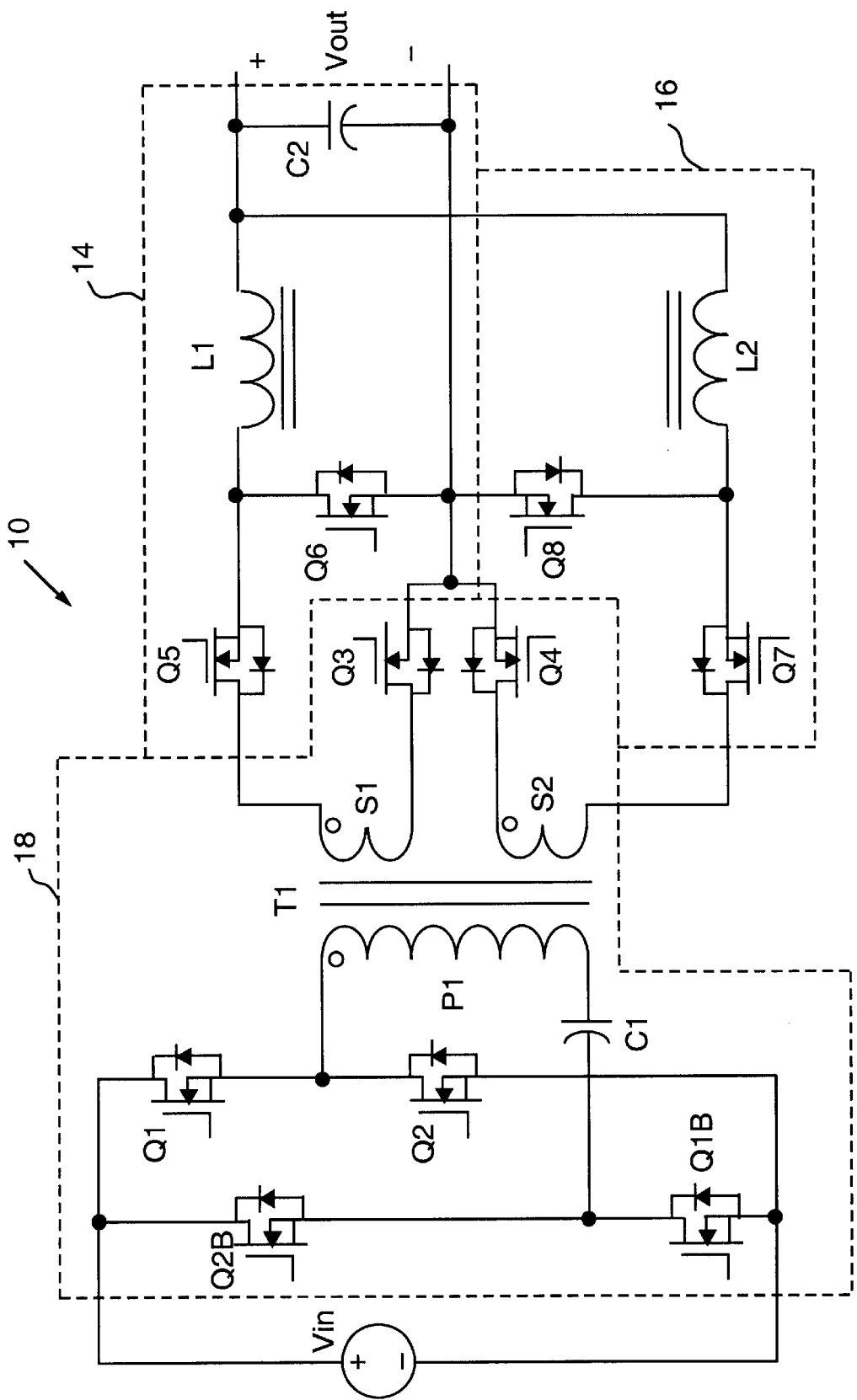

FIG. 6 is a schematic diagram of the converter 10 according to another embodiment. The converter 10 of FIG. 6 is similar to that of FIG. 1, except that the half-bridge converter 12 has been replaced with a full-bridge converter 18. The input circuit of the full-bridge converter includes additional primary-side switches Q1B and Q2B, which may also be controlled by the control circuit (not shown) controlling the switches Q1, Q2. The converter 10 with the full-bridge configuration may operate similarly to the half-bridge configuration described hereinbefore with respect to FIGS. 1 and 2. The additional primary switches Q1B, Q2B may have the same timing (i.e., conduction/non-conduction cycles) as the switches Q1, Q2 respectively. In the illustrated embodiment, the primary circuit of the full-bridge converter 18 includes the capacitor C1, which may aid in balancing the volt-seconds across the transformer T1. The capacitor C1, however, is not necessary for the full-bridge configuration.

Figure 7:
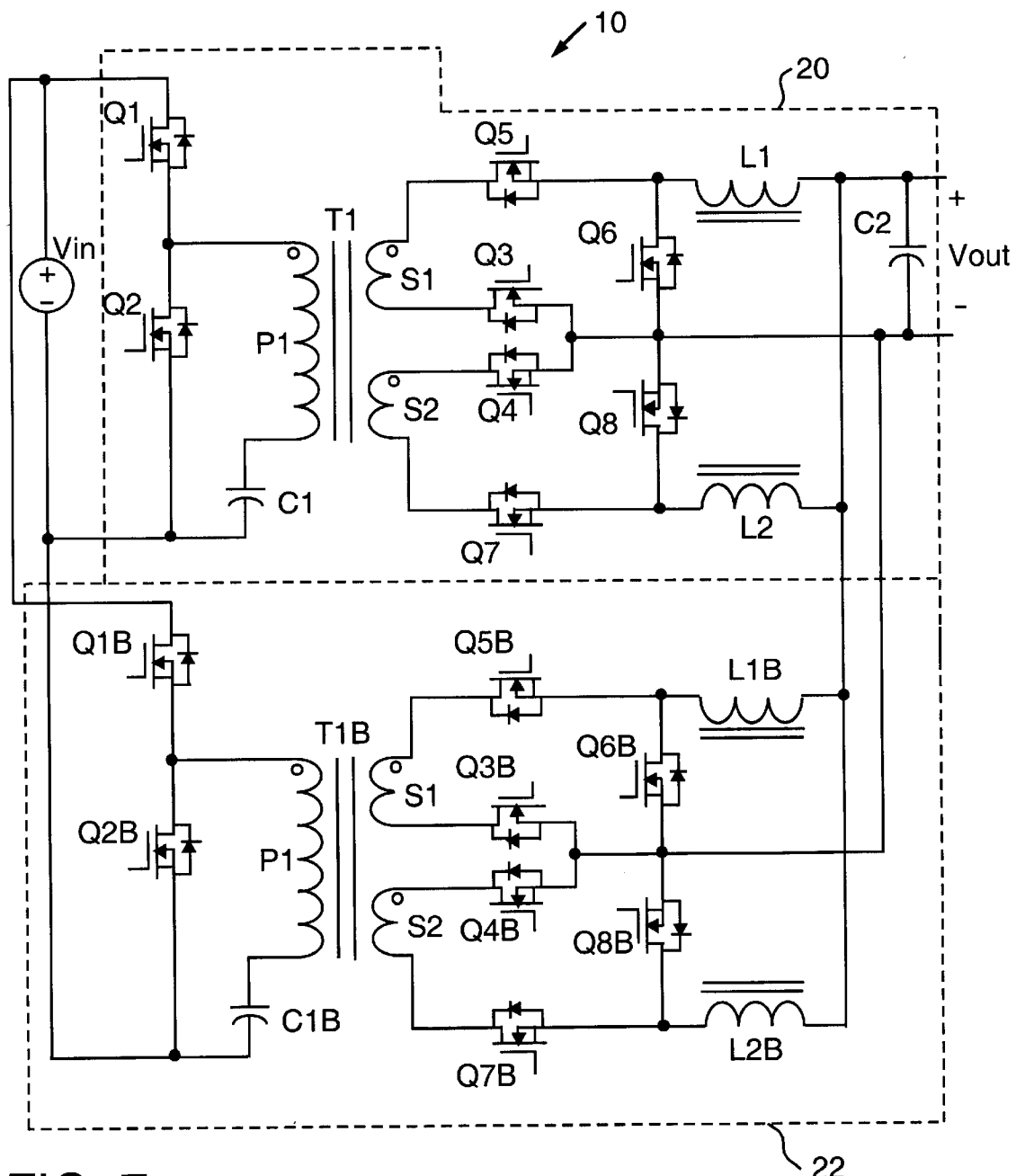

FIG. 7 is a schematic diagram of the converter 10 according to another embodiment. The embodiment of FIG. 7 is similar to that of FIG. 1, except that it includes two parallel connected bridge-fed converters 20, 22. Each of the first and second bridge-fed converters 20, 22 may be similar to the converters 10 described hereinbefore with respect to FIGS. 1 and 3–6, and may share a common output capacitor C2 to provide a single output voltage $V_{out}$. In the illustrated embodiment, the first and second bridge-fed converters 20, 22 are similar to the converter 10 illustrated in FIG. 1. The second bridge-fed converter 22 includes primary-side switches Q1B and Q2B, a transformer T1B, a capacitor C1B, and output synchronous rectifiers Q3B, Q4B feeding two buck converters. A first of the buck converters of the second converter 22 includes switches Q5B, Q6B, an inductor L1B, and the capacitor C2. The second buck converter includes the switches Q7B, Q8B, an inductor L2B, and the capacitor C2. The second bridge converter 12 may operate in a similar fashion as the first, as described hereinbefore with respect to FIGS. 1 and 2, except that, according to one embodiment, the conduction/nonconduction cycles of the primary switches Q1B, Q2B may be, for example, ninety degrees out of phase with the conduction/non-conduction cycles of the switches Q1, Q2. Consequently, the power level of the converter 10 may be increased while effectively doubling the output ripple frequency. Such an embodiment permits the utilization of smaller output filter components (inductors L1, L2, L1B, L2B and capacitor C2) and improved transient response.

Figure 8:
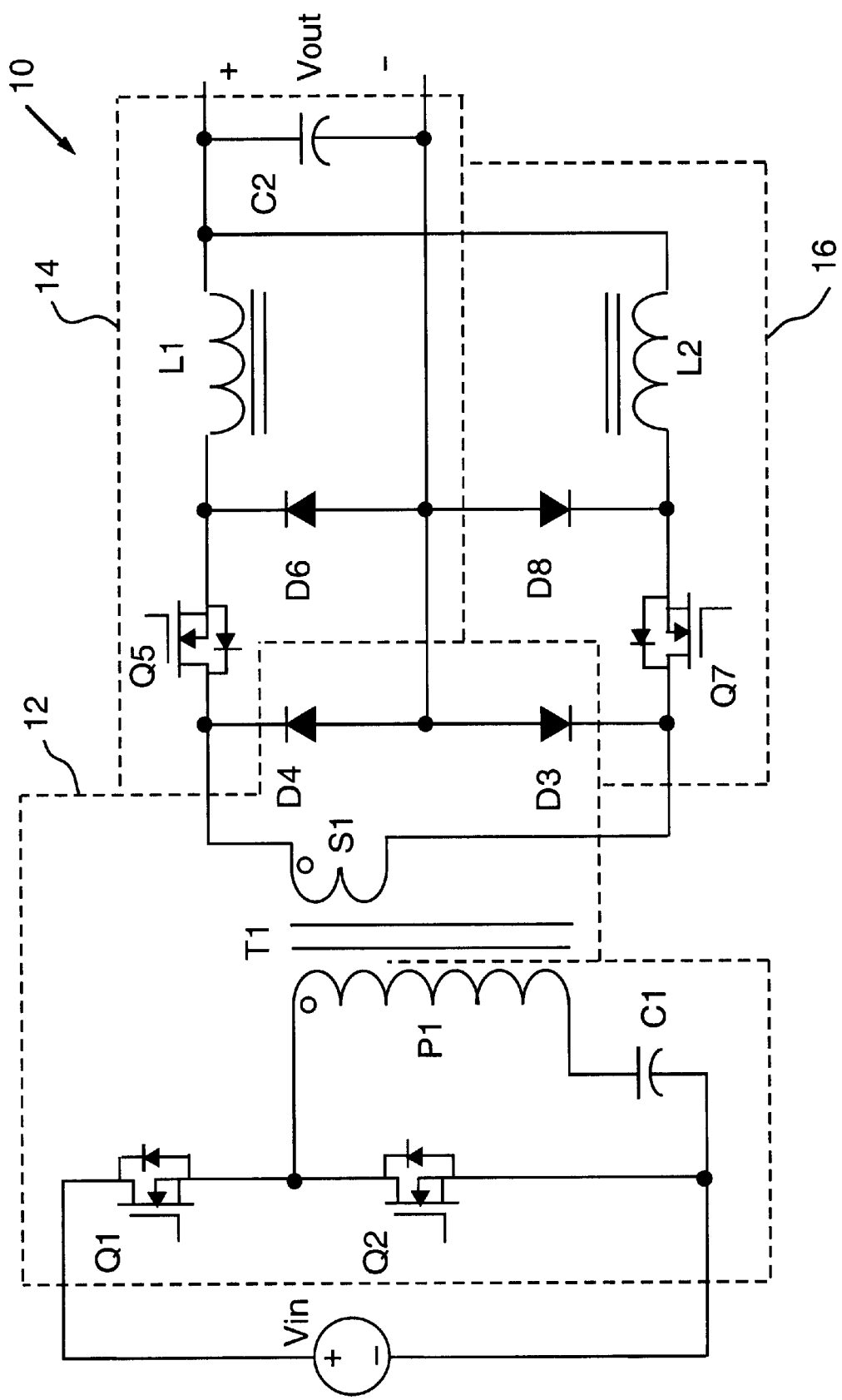
Figure 9:
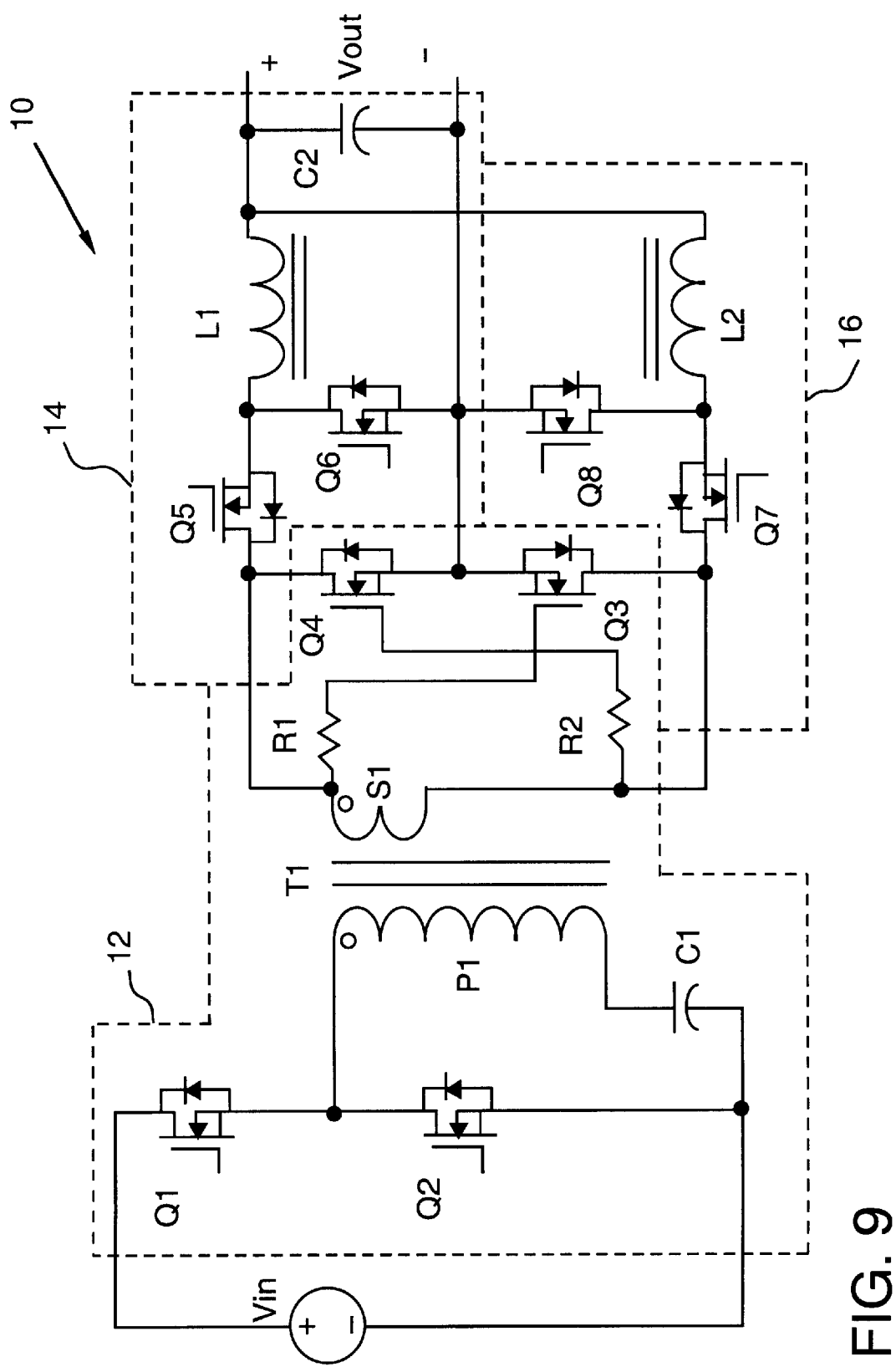

FIGS. 8–11 are schematic diagrams of the power converter 10 according to other embodiments. In these embodiments, the second secondary winding S2 of the transformer T1 is eliminated. FIG. 8 illustrates an embodiment without synchronous rectification, and FIG. 9 illustrates an embodiment with synchronous rectification. The operation of the power converters 10 illustrated in FIGS. 8 and 9 is similar to that described hereinbefore with respect to FIGS. 1 and 2. In addition, although the synchronous rectifiers Q3, Q4 are illustrated in FIG. 9 as being self-driven, according to other embodiments, the synchronous rectifiers Q3, Q4 may be, for example, control-driven.

Figure 10:
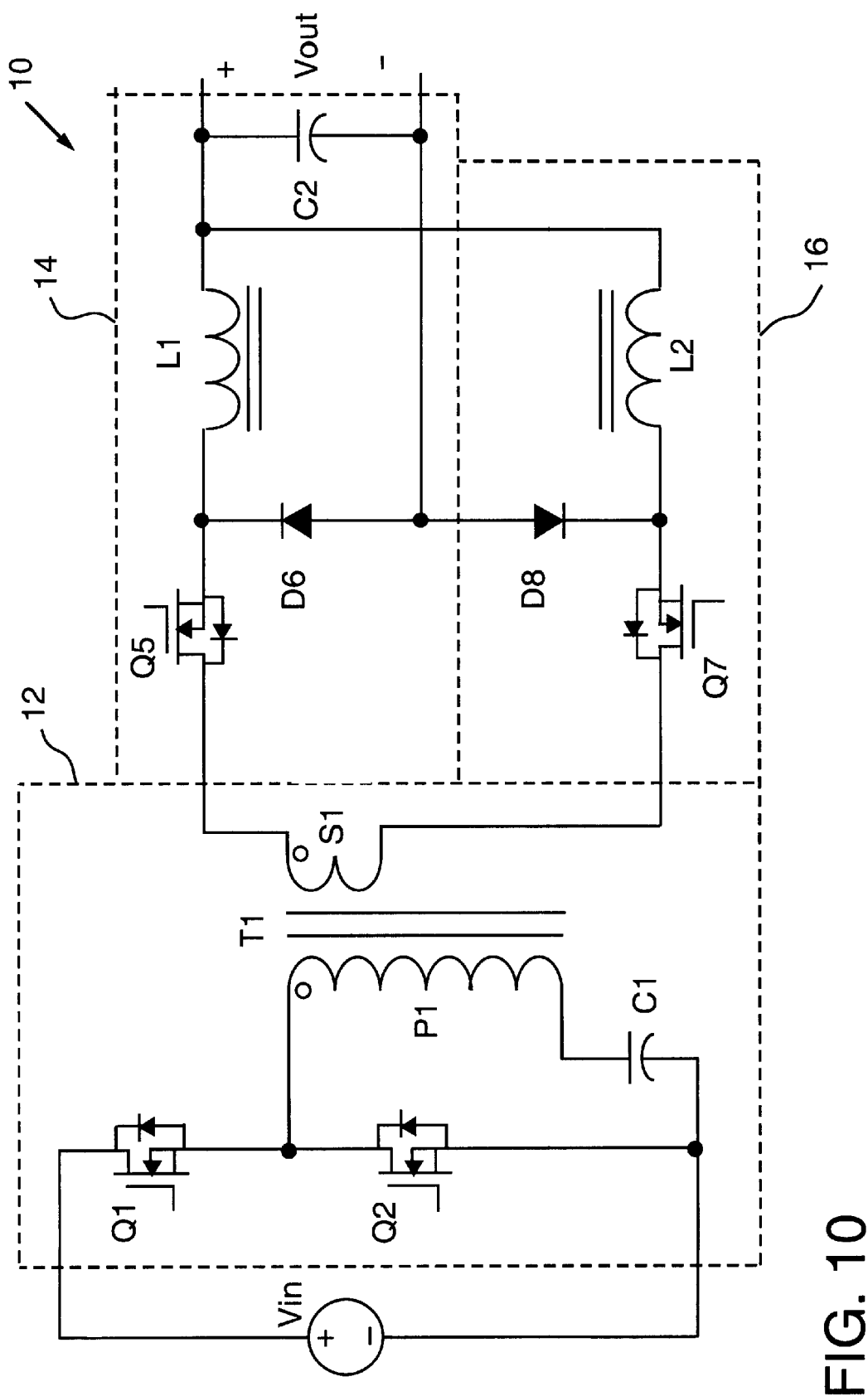
Figure 12:
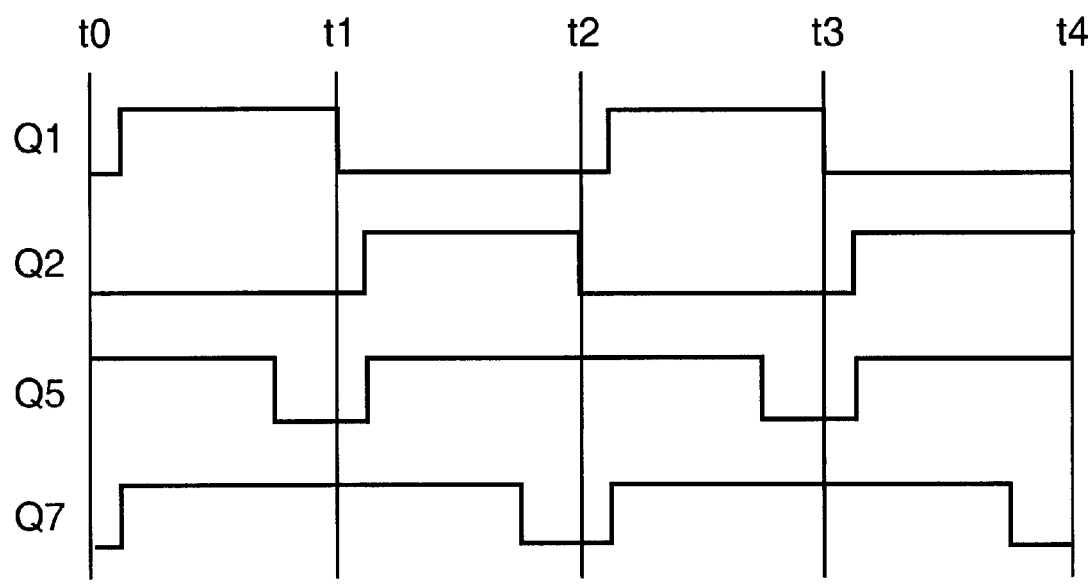
FIG. 12 is a timing diagram illustrating the operation of the power converter of FIG. 10 according to one embodiment of the present invention.

The power converter 10 illustrated in FIG. 10 is similar to that of FIG. 8, except that the rectifying diodes D4, D3 have been eliminated. The operation of the power converter 10 of FIG. 10 will be described in conjunction with the timing diagram of FIG. 12, which shows the gate-source voltages for switches Q1, Q2, Q5 and Q7. At the start of the first half cycle (t0), when the switch Q1 turns ON, the switch Q7 turns ON and the diode D8 conducts. When the switches Q1, Q7 turn ON, the switch Q5 may still be ON from the previous half cycle, and the diode D6 may be blocking. The voltage across the secondary winding S1 is applied to the inductor L1. The switch Q5 may be modulated by a control circuit (not shown) to regulate the output voltage ($V_{out}$) for this half cycle (t0–t1). When the switch Q5 is turned OFF, the diode D6 conducts current through the inductor L1, and the diode D8 may still be conducting current through the inductor L2.

At the end of the first half cycle (t1), the switch Q1 turns OFF, and after a short delay to allow the magnetizing and leakage inductance of the transformer T1 to force the voltage at the node between the switches Q1, Q2 down to realize ZVS, the switch Q2 may turn ON. When the switch Q2 turns ON, the switch Q5 turns ON. The switch Q7 may still be ON from the previous half cycle. For substantially the entire second half cycle (t1–t2), the switches Q2, Q5, and Q7 remain ON, and the diode D8 is blocking. As a result, the voltage across the secondary winding S1 is applied to the inductor L2. The ON time for the switch Q7 may be modulated by the control circuit (not shown) to regulate the output voltage ($V_{out}$) for the second half cycle (t1–t2). When the switch Q7 turns OFF, the diode D8 conducts current through the inductor L2. The diode D6 may still be conducting current through the inductor L1.

At the end of the second half cycle (t2), the switch Q2 turns OFF, and after a short delay to allow the magnetizing and leakage current inductance of T1 to force the voltage at the node between the switches Q1, Q2 up to realize ZVS, the switch Q1 turns ON. As discussed hereinbefore, when the switch Q1 turns ON, the switch Q7 turns ON, and the switch Q5 may remain ON from the previous half cycle.

Figure 11:
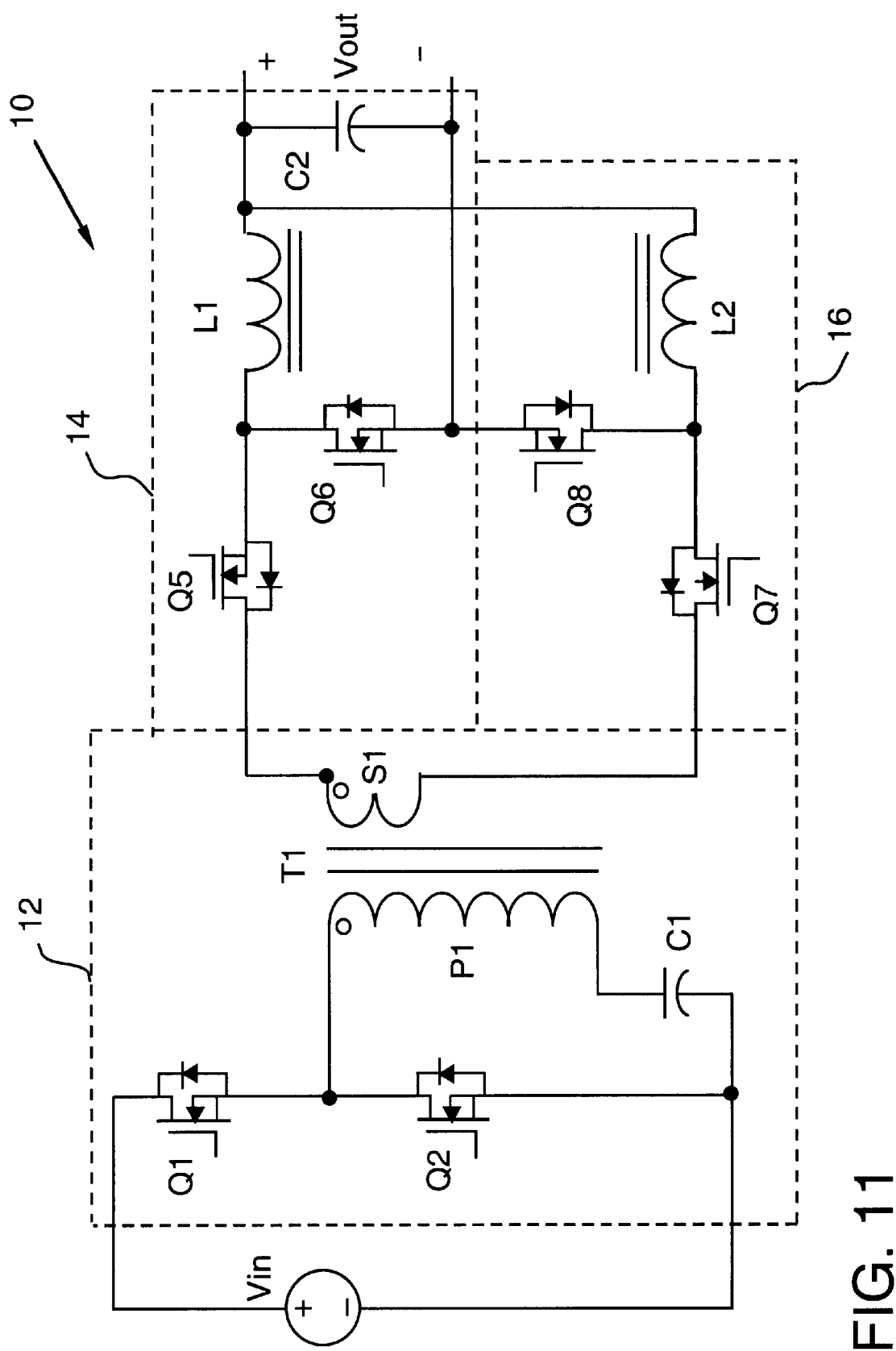

The power converter 10 of FIG. 11 may utilize trailing-edge modulation of the switches Q5 and Q7 to achieve output regulation. According to another embodiment of the present invention, the power converter 10 may utilize leading-edge modulation of the switches Q5 and Q7 to achieve output regulation.

The power converter 10 illustrated in FIG. 11 is similar to that of FIG. 10, except that the diodes D6, D8 have been replaced with switches Q6, Q8. The operation of the power converter 10 of FIG. 11 is similar to that of FIG. 10.

Figure 13:
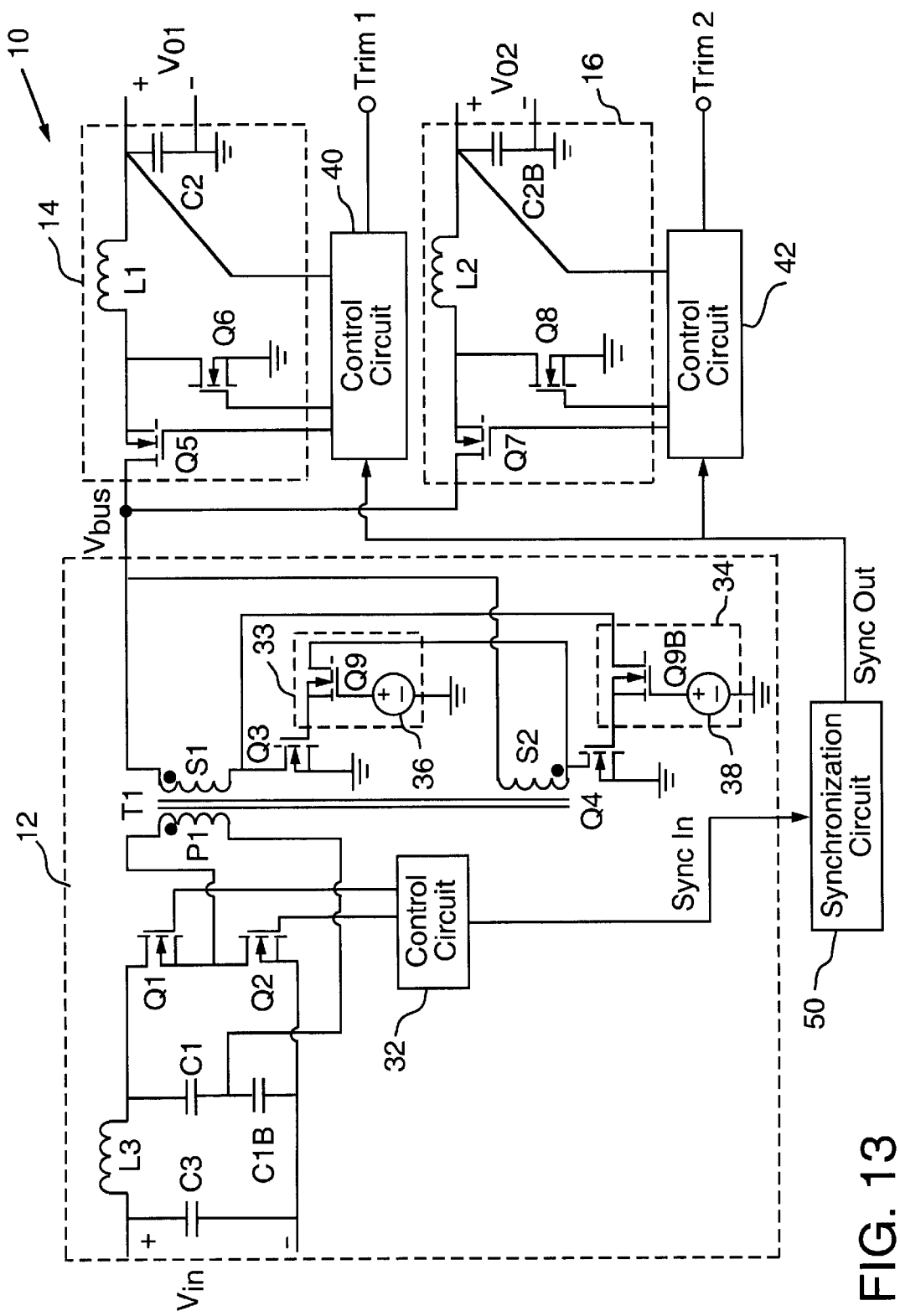
FIG. 13 is a schematic diagram of the power converter according to another embodiment of the present invention.

FIG. 13 is a diagram of the power converter 10 according to another embodiment. Like the converters 10 described previously, the converter 10 illustrated in FIG. 13 includes two stages. The first stage includes the symmetrical half-bridge converter 12. The second stage includes the pair of synchronous buck converters 14, 16. According to the illustrated embodiment, as described further hereinbelow, the symmetrical half-bridge converter 12 provides a rectified pulsating voltage, denoted as $V_{bus}$ in FIG. 13, which is supplied to the synchronous buck converters 14, 16. Each synchronous buck converter 14, 16 provides a separate output voltage, denoted as $V_{o1}$, and $V_{o2}$ respectively in FIG. 13. Although only two synchronous buck converters 14, 16 are shown in FIG. 13, other embodiments contemplate a different number of synchronous buck converters coupled to the symmetrical half-bridge converter 12, such as one or more than two synchronous buck converters. In addition, although the first stage is illustrated in FIG. 13 as being a symmetrical half-bridge converter 12, according to other embodiments, the first stage may employ, for example, a push-pull topology, as described further hereinbelow with respect to FIG. 14, or a full-bridge topology.

The symmetrical half-bridge converter 12 includes primary switches Q1, Q2 which may symmetrically drive the primary winding P1 of the transformer T1. The switches Q1, Q2 may be driven by a control circuit 32 at a duty cycle of between 25% and 50% to realize ZVS, as described further hereinbelow.

The control circuit 32 may be an open loop control circuit that is unresponsive to the output voltages $V_{o1}$, $V_{o2}$. Accordingly, the voltage across the secondary windings S1, S2 may be unregulated. The primary circuit of the symmetrical half-bridge converter 12 may also include, as illustrated in FIG. 13, an input filter comprising a capacitor C3 and an inductor L3. In addition, the symmetrical half-bridge converter 12 may include two series-connected capacitors C1, C1B connected across the input voltage source ($V_{in}$).

The synchronous rectifiers Q3, Q4 are respectively coupled to the secondary windings S1, S2 of the transformer T1. According to one embodiment, as illustrated in FIG. 13, the synchronous rectifiers Q3, Q4 may be self-driven. According to such an embodiment, the control terminals of the synchronous rectifier Q3 may be driven by a voltage across the second secondary winding S2 and the synchronous rectifier Q4 may be driven by a voltage across the first secondary winding S1. In addition, according to one embodiment, the symmetrical half-bridge converter 12 may include a pair of drive circuits 33, 34 to limit the voltage applied to the control terminals of the synchronous rectifiers Q3, Q4. The drive circuits 33, 34 may each respectively include a drive switch Q9, Q9B and a bias voltage source 36, 38. The drive switches Q9, Q9B may be transistors such as, for example, FET or bipolar transistors.

The rectified, unregulated half-cycle voltages from the secondary windings S1, S2 are combined to produce the full-wave rectified, unregulated voltage $V_{bus}$. This voltage is input to each of the synchronous buck converters 14, 16. The switches Q5, Q6 of the first synchronous buck converter 14 may be controlled by a control circuit 40, which is responsive to the output voltage $V_{o1}$ of the first synchronous buck converter 14. The switches Q7, Q8 of the second synchronous buck converter 16 may be controlled by a control circuit 42, which is responsive to the output voltage $V_{o2}$ of the second synchronous buck converter 16.

As illustrated in FIG. 13, the first stage of the power converter 10 (i.e., the symmetrical half-bridge converter) does not include an output filter to thereby realize ZVS. Accordingly, the voltage $V_{bus}$ may additionally be unfiltered. To compensate for the unfiltered nature of the voltage $V_{bus}$, the control circuits 40, 42 may be synchronized with edges (either leading or trailing) of the pulses of the voltage $V_{bus}$. According to one embodiment, synchronization may be realized with a synchronization circuit 50 for transmitting synchronization pulses between the primary and secondary control circuits, which is described in more detail hereinbelow with respect to FIG. 15. Each of the control circuits 40, 42 may also be responsive to trim signals Trim1, Trim2 respectively, to permit variation of the output voltages $V_{o1}$, $V_{o2}$ to suit a particular load application. The output voltages $V_{o1}$, $V_{o2}$ of the converter 10 may be completely independent, and $V_{o1}$ may be greater than or less than $V_{o2}$.

As discussed hereinbefore, the switches Q1 and Q2 may be driven at any duty between 25% and 50% without sacrificing ZVS, assuming no reflected secondary side current flowing in the primary side during the commutation of the switches Q1, Q2. That is, in a given cycle, Q1 (or Q2) may be turned off after both Q5 and Q7 have been turned off. Turning Q1 and Q2 off immediately after both Q5 and Q7 have been turned off has the advantage of reduced losses in the core of the transformer T1 and results in high power conversion efficiency. As long as the drive duty cycle for Q1 and Q2 is kept above 25%, ZVS operation may be maintained through the transformer magnetizing current. According to other embodiments, however, the duty cycle for the switches Q1 and Q2 may be maintained close to 50%. In addition, as discussed hereinbefore, the buck converters 14, 16 may be trailing-edge or leading-edge modulated. To realize ZVS, the forward switches Q5 and Q7 may be turned on after the primary side commutation is complete, and turned off before the primary side commutation of the next cycle is initiated. In certain applications, trailing-edge modulation may be easier to implement.

Figure 14:
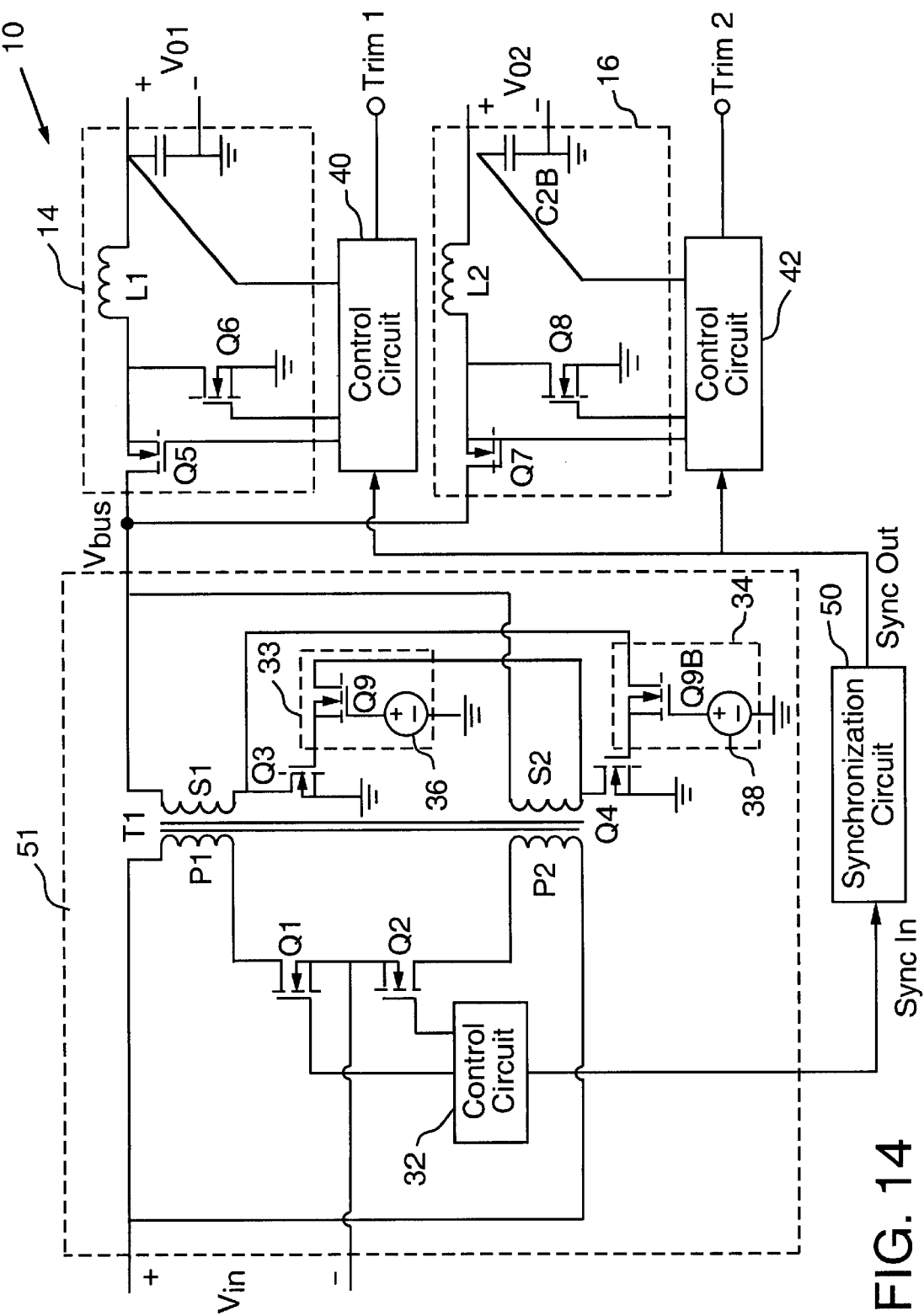
FIG. 14 is a schematic diagram of the power converter according to another embodiment of the present invention.

FIG. 14 is a diagram of the power converter 10 according to another embodiment. The power converter 10 of FIG. 14 is similar to that of FIG. 13, except that the first stage of the power converter 10 includes a push-pull converter 51. According to such an embodiment, the transformer T1 includes two primary windings P1, P2. The primary circuit switches Q1, Q2 are coupled between the primary windings P1, P2. Using a push-pull topology, as illustrated in FIG. 14, simplifies the primary circuit of the first stage. However, open-loop push pull converters potentially implicate transformer saturation issues.

Figure 15:
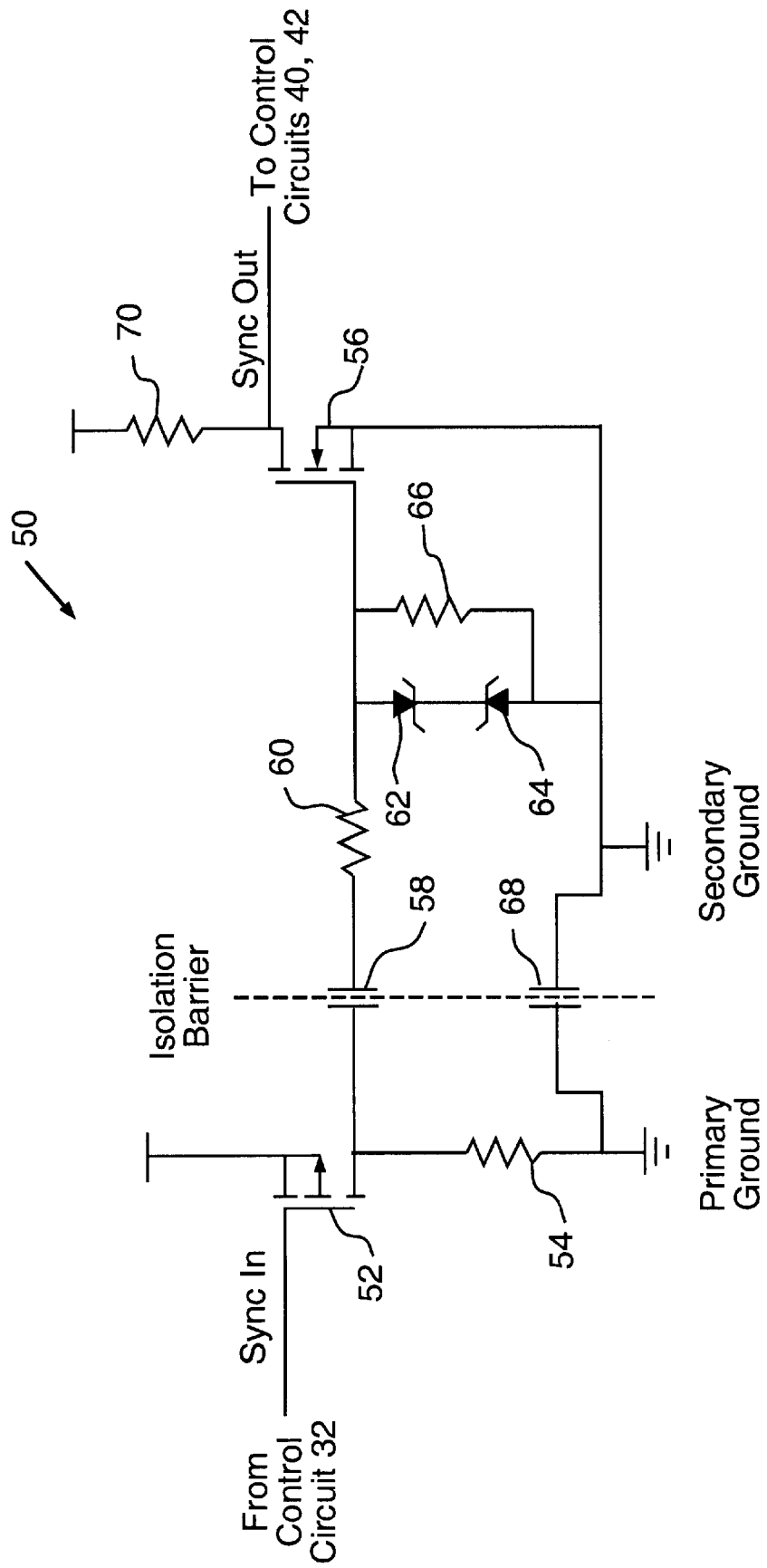
FIG. 15 is a schematic diagram of the synchronization circuit according to one embodiment of the present invention.

FIG. 15 is a diagram of the synchronization circuit 50 according to one embodiment of the present invention. According to the illustrated embodiment, the synchronization circuit 50 includes a transistor 52 such as, for example, a p-channel enhancement MOSFET, having a gate terminal coupled to the input synchronization signal ("Sync In"), which is supplied from the control circuit 32. The drain terminal of the transistor 52 may be coupled to primary-side ground via a resistor 54. The drain terminal of the transistor 52 may be coupled across the isolation barrier to the control terminal of a switch 56 via a capacitor 58 and a resistor 60. The transistor 56 may be, for example, an n-channel enhancement MOSFET. The synchronization circuit 50 may also include a pair of series-connected Zener diodes 62, 64 connected between the control terminal of the transistor 56 and the secondary ground. In addition, the synchronization circuit 50 may include a resistor 66 connected in parallel with the Zener diodes 62, 64. Further, a capacitor 68 may be coupled between primary ground and secondary ground. The drain terminal of the transistor 56 may yield the output synchronization signal ("Sync Out"), which is coupled to the control circuits 40, 42. A resistor 70 may also be coupled to the drain terminal of the transistor 56. The capacitors 58 and 68 cross the isolation barrier and may compensate for any existing dc differential between primary and secondary grounds. The resistor 60 and Zener diodes 62, 64 may protect the gate terminal of the transistor 56.

According to such an embodiment using, for example, falling-edge modulation, the falling edges of the input synchronization signal (Sync In) are capacitively transmitted through the capacitors 58, 68 to the transistor 56, and lead to falling edges of the output synchronization signal (Sync Out). The synchronization circuit 50 is inherently very high-speed with small (negligible) delays between input and output.

For optimum timing, a primary synchronization pulse may be generated before commutation of the primary switches Q1, Q2 is started. As such, the output synchronization signal Sync Out is available in advance of power pulses. Therefore, even in the presence of significant secondary synchronization delays, optimally timed turn-on of the switches Q5 and Q7 may be achieved.

Although the present invention has been described herein with respect to certain embodiments, those of ordinary skill in the art will recognize that many modifications and variations may be implemented. For example, the transformer T1 of the power converter 10 may include multiple primary, secondary, and/or tertiary windings. The foregoing description and the following claims are intended to cover all such modifications and variations.

What is claimed is:

1. A power converter for producing at least one output voltage, comprising:

a symmetrical half-bridge converter including a transformer having a primary winding and first and second secondary windings, a primary circuit coupled to the primary winding, a first rectifier circuit coupled to the first secondary winding, and a second rectifier circuit coupled to the second secondary winding, wherein the primary circuit includes first and second primary switches that are not regulated based on the output voltage; and first and second buck converters coupled to the half-bridge converter, wherein:

the first buck converter includes a first rectifying device that is regulated based on the output voltage; and the second buck converter includes a second rectifying device that is regulated based on the output voltage.

2. The power converter of claim 1, wherein the first and second primary switches each have a duty cycle of less than fifty percent such that the first switch is turned on when a voltage drop across the first switch is substantially zero and such that the second switch is turned on when a voltage drop across the second switch is substantially zero.

3. The power converter of claim 2, wherein the first buck converter is coupled to the first rectifier circuit, the second buck converter is coupled to the second rectifier circuit, and outputs of the first and second buck converters are combined to provide a single output voltage.

4. The power converter of claim 3, wherein the first rectifier circuit includes a first synchronous rectifier.

5. The power converter of claim 4, wherein the second rectifier circuit includes a second synchronous rectifier.

6. The power converter of claim 5, wherein at least one of the first and second synchronous rectifiers is control-driven.

7. The power converter of claim 5, wherein at least one of the first and second synchronous rectifiers is self-driven.

8. The power converter of claim 4, wherein the second rectifier circuit includes a diode.

9. The power converter of claim 3, wherein:

the first rectifier circuit includes a diode; and the second rectifier circuit includes a diode.

10. The power converter of claim 2, wherein:

the first buck converter is coupled to both the first and second rectifier circuits and wherein the first buck converter is for producing a first output voltage; and the second buck converter is coupled to both the first and second rectifier circuits and wherein the second buck converter is for producing a second output voltage.

11. The power converter of claim 10, wherein:

the first rectifier circuit of the half-bridge converter circuit includes a first synchronous rectifier; and the second rectifier circuit of the half-bridge converter circuit includes a second synchronous rectifier.

12. The power converter of claim 11, wherein the first and second synchronous rectifiers are self-driven.

13. The power converter of claim 12, further comprising a first gate drive circuit coupled to the first synchronous rectifier.

14. The power converter of claim 13, wherein the first gate drive circuit includes a FET.

15. The power converter of claim 13, further comprising a second gate drive circuit coupled to the second synchronous rectifier.

16. The power converter of claim 1, wherein the first buck converter includes a first edge-synchronized control circuit coupled to the first rectifying device.

17. The power converter of claim 16, wherein the second buck converter includes a second edge-synchronized control circuit coupled to the second rectifying device.

18. The power converter of claim 17, further comprising:

a primary control circuit for controlling the first and second primary switches; and a synchronization circuit coupled between the primary control circuit and the first and second edge-synchronized control circuits.

19. The power converter of claim 18, wherein the synchronization circuit includes:

a first transistor having first and second terminals defining a conduction path therebetween and having a control terminal, wherein the control terminal is coupled to a synchronization output terminal of the primary control circuit;

a second transistor having first and second terminals defining a conduction path therebetween and having a control terminal, wherein the control terminal is coupled to the first terminal of the first transistor and the first terminal of the second transistor is coupled to the first and second edge-synchronized control circuits; and a first capacitor coupled between the first terminal of the first transistor and the control terminal of the second transistor.

20. The power converter of claim 19, wherein:

the first terminal of the first transistor of the synchronization circuit is coupled to a primary ground; and the second terminal of the second transistor of the synchronization circuit is coupled to a secondary ground;

the synchronization circuit further includes a second capacitor coupled between primary ground and secondary ground.

21. The power converter of claim 1, further comprising:

a second symmetrical half-bridge converter coupled in parallel with the half-bridge converter; and third and fourth buck converters coupled to the second symmetrical half-bridge converter.

22. The power converter of claim 21, wherein outputs of the first, second, third, and fourth buck converters are coupled together.

23. The power converter of claim 1, wherein the first and second primary switches of the primary circuit of the symmetrical half-bridge converter are simultaneously off for a fixed time period per a switching cycle.

24. The power converter of claim 1, wherein the first rectifying device and the second rectifying device are not simultaneously on during a switching cycle.

25. The power converter of claim 3, wherein the first and second primary switches of the primary circuit of the symmetrical half-bridge converter are simultaneously off for a fixed time period per a switching cycle.

26. The power converter of claim 25, wherein the first rectifying device and the second rectifying device are not simultaneously on during a switching cycle.

27. A power converter for producing at least one output voltage, comprising:
   a first power conversion stage including a transformer, at least two primary switches coupled to the transformer, a first rectifier circuit coupled to the transformer, and a second rectifier circuit coupled to the transformer, wherein:
      the transformer includes first and second secondary windings;
      the first rectifier circuit is coupled to the first secondary winding;
      the second rectifier circuit is coupled to the second secondary winding; and
      the at least two primary switches are not regulated based on the output voltage; and
   a second power conversion stage coupled to the first and second rectifier circuits of the first power conversion stage, the second power conversion stage including first and second buck converters, wherein:
      the first buck converter includes a first rectifying device that is regulated based on the output voltage; and
      the second buck converter includes a second rectifying device that is regulated based on the output voltage.

28. The power converter of claim 27, wherein the at least two primary switches have a duty cycle of less than fifty percent such that a first primary switch of the at least two primary switches is turned on when a voltage drop across the first primary switch is substantially zero and such that a second primary switch of the at least two primary switches is turned on when a voltage drop across the second primary switch is substantially zero.

29. The power converter of claim 27, wherein the first buck converter is coupled to an output of the first rectifier circuit, the second buck converter is coupled an output of the second rectifier circuit, and outputs of the first and second buck converters are combined to provide a single output voltage.

30. The power converter of claim 27, wherein:
   the first buck converter is coupled to the first and second rectifier circuits and is for producing a first output voltage; and
   the second buck converter is coupled to the first and second rectifier circuits and is for producing a second output voltage.

31. The power converter of claim 30, wherein the first rectifier circuit includes a self-driven synchronous rectifier and the second rectifier circuit includes a second self-driven synchronous rectifier.

32. The power converter of claim 31, further comprising:
   a first gate drive circuit coupled to the first synchronous rectifier; and
   a second gate drive circuit coupled to the second synchronous rectifier.

33. The power converter of claim 31, wherein at least one of the first and second gate drive circuits includes a FET.

34. The power converter of claim 30, wherein:
   the first buck converter includes a first edge-synchronized control circuit; and
   the second buck converter includes a second edge-synchronized control circuit.

35. The power converter of claim 34, further comprising:
   a primary control circuit for controlling the at least two primary switches; and
   a synchronization circuit coupled between the primary control circuit and the first and second edge-synchronized control circuits.

36. The power converter of claim 35, wherein the synchronization circuit includes:
   a first transistor having first and second terminals defining a conduction path therebetween and having a control terminal, wherein the control terminal is coupled to a synchronization output terminal of the primary control circuit;
   a second transistor having first and second terminals defining a conduction path therebetween and having a control terminal, wherein the control terminal is coupled to the first terminal of the first transistor and the first terminal of the second transistor is coupled to the first and second edge-synchronized control circuits; and
   a first capacitor coupled between the first terminal of the first transistor and the control terminal of the second transistor.

37. The power converter of claim 36, wherein:
   the first terminal of the first transistor of the synchronization circuit is coupled to a primary ground; and
   the second terminal of the second transistor of the synchronization circuit is coupled to a secondary ground;
   the synchronization circuit further includes a second capacitor coupled between primary ground and secondary ground.

38. The power converter of claim 27, wherein the at least two primary switches are simultaneously off for a fixed time period per a switching cycle.

39. The power converter of claim 27, wherein the first rectifying device and the second rectifying device are not simultaneously on during a switching cycle.

40. The power converter of claim 28, wherein the at least two primary switches are simultaneously off for a fixed time period per a switching cycle.

41. The power converter of claim 40, wherein the first rectifying device and the second rectifying device are not simultaneously on during a switching cycle.

42. A power converter for producing at least one output voltage, comprising:
   a symmetrical half-bridge converter including a transformer having a primary winding and first and second secondary windings, a primary circuit coupled to the primary winding, a first rectifier circuit coupled to the first secondary winding, and a second rectifier circuit coupled to the second secondary winding, wherein the primary circuit includes first and second primary switches that are not regulated based on the output voltage; and
   a first buck converter coupled to the first and second rectifier circuits of the half-bridge converter, wherein the first buck converter includes a first rectifying device that is regulated based on the output voltage.

43. The power converter of claim 42, wherein the first and second primary switches have a duty cycle of less than fifty percent such that the first primary switch is turned on when a voltage drop across the first primary switch is substantially zero and such that the second primary switch is turned on when a voltage drop across the second primary switch is substantially zero.

44. The power converter of claim 43, wherein:

the first rectifier circuit includes a first synchronous rectifier; and the second rectifier circuit includes a second synchronous rectifier.

45. The power converter of claim 43, wherein:

the first rectifier circuit includes a first diode; and the second rectifier circuit includes a second diode.

46. The power converter of claim 42, wherein the at least two primary switches are simultaneously off for a fixed time period per a switching cycle.

47. The power converter of claim 43, wherein the at least two primary switches are simultaneously off for a fixed time period per a switching cycle.

48. A power converter for producing a first output voltage, comprising:

a symmetrical half-bridge converter including a transformer having a primary winding and a secondary winding, and a primary circuit coupled to the primary winding, wherein the primary circuit includes first and second primary switches that are not regulated based on the output voltage; and first and second buck converters coupled to the secondary winding of the transformer, wherein:

the first buck converter includes a first rectifying device that is regulated based on the output voltage; and the second buck converter includes a second rectifying device that is regulated based on the output voltage.

49. The power converter of claim 48, wherein the first and second primary switches have a duty cycle of less than fifty percent such that the first primary switch is turned on when a voltage drop across the first primary switch is substantially zero and such that the second primary switch is turned on when a voltage drop across the second primary switch is substantially zero.

50. The power converter of claim 48, wherein the at least two primary switches are simultaneously off for a fixed time period per a switching cycle.

51. The power converter of claim 48, wherein the first rectifying device and the second rectifying device are not simultaneously on during a switching cycle.

52. The power converter of claim 49, wherein the at least two primary switches are simultaneously off for a fixed time period per a switching cycle.

53. The power converter of claim 52, wherein the first rectifying device and the second rectifying device are not simultaneously on during a switching cycle.

* * * * *